United States Patent Office 3,450,657
Patented June 17, 1969

3,450,657
ALKALI SOLUBLE POLISH RESINS
Herbert J. Mellan, Buffalo, and Daniel J. Kay, Tonawanda, N.Y., assignors to Hooker Chemical Corporation, Niagara Falls, N.Y., a corporation of New York
No Drawing. Continuation-in-part of application Ser. No. 284,826, June 30, 1963. This application Nov. 28, 1966, Ser. No. 597,218
Int. Cl. C09g 1/10; C08g 17/04, 17/16
U.S. Cl. 260—26       10 Claims

ABSTRACT OF THE DISCLOSURE

This invention relates to resinous products suitable for use as a coating composition in emulsion systems comprising an alkali soluble polymerized partial ester containing a polyol prepolymer ester of a molar excess of a saturated glycol linked through ester linkages to an aromatic dicarboxylic compound, said polyol prepolymer being linked through ester linkages with a molar excess of a Diels-Alder adduct of rosin and an unsaturated dicarboxylic compond to form a resinous partial ester of said polyol prepolymer and adduct having an acid number of about 70 to 200.

---

This is a continuation-in-part of SN 284,826 filed June 30, 1963, now abandoned.

This invention relates to resins which are soluble in aqueous ammonia, for use in emulsion polish systems and to a process for producing such resins. The invention also relates to improved emulsion polish systems.

Emulsion polishes are sometimes referred to as high resin formulas or polymer type formulas. These formulas contain as a principal ingredient, a polymer emulsion, such as an emulsion of a modified polystyrene, a modified polyacrylic, a blend of the two, or a complex styrene acrylic copolymer. The balance of the polish usually comprises a synthetic waxy polymer, an ammonia soluble resin, an emulsifying agent and a diluent comprising water and a basic component such as ammonia or an organic amine. Modified polystyrene emulsions are not, in themselves, film formers. The application of an emulsion thereof to a surface normally results in a powdery residue. The use of a plasticizer reduces this tendency to some extent, but does not make the particles sufficiently cohesive to give a continuous film. To insure the proper functioning of the small particle size modified polymer emulsion, it has been found desirable to provide a redispersible film forming matrix therefor.

Alkali soluble or more specifically ammonia soluble resins and synthetic waxy polymers such as emulsifiable polyethylene, are the major components of such a film forming matrix. The matrix should be water repellent, hard enough to pevent embedment, flexible to prevent surface cracking or glazing, cohesive and adhesive enough to hold the film to the floor surface. The waxy component is dispersed in the water with the aid of emulsifying agent and the basic component. The resin should be soluble in the basic emulsion system wherein it serves to improve the gloss and hardness of the polish and functions as a binder and leveling agent.

A number of polymers has been used as the ammonia soluble resin, including low molecular weight polyols, maleic anhydride and fumaric acid condensation products of polyhydric compounds, shellac and casein. Many of the resins previously employed have resulted in a darkening of the surfaces, such as wood floors and composition floors such as linoleum, rubber or vinyl tile and the like, on which the polish is applied. Likewise, the resins used herebefore have been somewhat deficient in not imparting desired water resistance to the emulsion polishes.

Accordingly, it is an object of this invention to provide an improved alkali-soluble resin for use in emulsion systems, as well as a process for producing such a resin. Another object is to provide an alkali soluble resin that is very light in color. A further object is to provide an emulsion polish which results in a surface of excellent water resistance, gloss and hardness. Still another object is to make an alkali soluble resin that serves as a superior leveling agent in an emulsion polish. Other objects and advantages will become apparent from this specification.

In accordance with this invention there are provided superior substantially linear alkali soluble resins having a slight degree of cross-linking that are suitable for use in emulsion polish systems, which comprise an alkali soluble polymerized partial ester containing a polyol prepolymer ester of a molar excess of a saturated glycol linked through ester linkages to an aromatic dicarboxylic compound, said polyol prepolymer being linked through ester linkage with a molar excess of a Diels-Alder adduct of rosin and an unsaturated dicarboxylic compound to form a partial ester of said polyol prepolymer and adduct having an acid number of about 70 to 200.

The term rosin as employed herein is understood to embrace both gum and wood rosins. Rosin is generally recognized as having approximately the same ratio of rosin acids to unsaponifiable materials, whether derived from wood stumps or from the sap of the pine tree. The major acid components of rosin are abietic acid and abietic-type acids which contain conjugated unsaturation.

Briefly the resins of this invention may be generalized as linear resins of the type illustrated by the formula

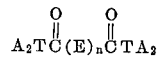

where T is the nucleous of the rosin adduct, E is the polyol polyester, A is COOH attached to the rosin adduct and $n$ is from 1 to 10. The more reactive carboxylic group of the rosin adduct is esterified to form the ester linkage with the polyol prepolymer. Normally, the carboxylic groups of the Diels-Alder reactant are the more reactive carboxylic groups. It is to be appreciated that a random A may be a site of minor crosslinking and that E may be an aliphatic polyhydroxyl compound instead of a polyol polyester. Furthermore, the resins of this invention may be mixtures of the above generalized structure. In one of the more preferred embodiments of this invention the formula would comprise primarily

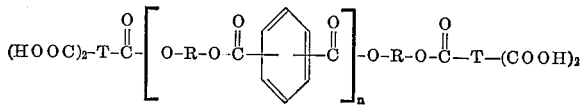

wherein R is alkyl of 2 to about 6 carbon atoms and T and $n$ as defined above.

It is convenient in discussing the resins of this invention to describe the various components of the resin after they have been incorporated into the resin structure in terms of residues or the balance of what remains or what has been incorporated into the structure. Therefore, the term residue has been employed to identify that portion of the reactant which remains after the reactant's characteristic group, such as acid, has been chemically reacted.

The unsaturated dicarboxylic compounds employed in this invention include the respective diacid, anhydride and diacid chloride. These dicarboxylic compounds may be further characterized as aliphatic compounds containing 4 to 6 carbon atoms. Most preferably, the diacids are $\alpha,\beta$-unsaturated. Suitable acids include maleic, fumaric, and itaconic acids.

The dihydroxyl compounds used to prepare the invented resins are saturated aliphatic glycols. Preferably these glycols contain from 2 to 6 carbon atoms. Preferably, the two hydroxyl groups are so located on the glycol structures so as to be unsymmetrical. Suitable glycols include, among others, 1,3-butylene glycol, propylene glycol, ethylene gycol and mixtures thereof. The dihydroxyl compounds may be reacted with an aromatic dicarboxylic compound to form an alkyl-aryl-alkyl dihydroxy compounds or a low molecular weight polyol polyester which particularly improves the compatibility of the invented resins with emulsions of polymers such as polystyrene and others which are derived from ethylenically unsaturated monomers. The polyester polyol will generally contain one to four repeating gycol-acid groups and terminate with hydroxyl groups at each end of the linear polyester. The aromatic dicarboxylic mono-nuclear compounds include isophthalic acid, terephthalic acid, phthalic acid, tetrahydrophthalic acid, hexahydrophthalic acid, phthalic anhydride, iso-phthaloyl chloride, terephtaloyl chloride and phthaloyl chloride. The polyol prepolymer is prepared by reacting a molar excess of glycol with the aromatic dicarboxylic compound under usual esterification conditions. Preferably, the glycol and dicarboxylic compounds are reacted in a molar ratio of about 1.1:1 to about 2.1:1 glycol to dicarboxylic.

It is to be appreciated that the molecular weight and the regularity of the repeating groups in the resins of this invention can be varied over a considerable range. Completely regular and repeating units of the reactants are undesirable because it has been found that symmetry reduces the solubility of the invented resins. The molecular weights of these resins may be varied between about 450 and about 1350 and preferably from about 600 to about 1200. A minor amount of the resin may be cross-linked but such cross-linking should be less than 10 percent and preferably will be from about two to about seven percent.

The rosin-unsaturated dicarboxylic adduct compound and polyol polyester are reacted in proportions such that the solid resin product has an acid number (milligrams of KOH per gram of resin) of about 70 to about 200. Solid resins having an acid number of about 100 to about 190 are preferred for the preparation of high quality surface coatings. The desired acid number is achieved by reacting a molar excess of rosin unsaturated dicarboxylic adduct with the polyol polyester in an amount commensurate with the desired residual acid number based on the combining weights of the reactants.

Any convenient temperature between 90 and 300 degrees centigrade may be employed in preparing the resin of this invention. More desirable is a temperature range between 110 and 250 degrees centigrade which provides a suitable reaction rate while reducing discoloration of the product due to side reaction. The reaction is preferably carried out under conditions which permit removal of water of condensation.

A polish composition of the invention contains in addition to the invented resins, a waxy polymer such as polyethylene or polypropylene, hard polymers such as polyvinyl chloride, polyacrylic resin or polystyrene, which are derived from ethylenically unsaturated monomers; leveling agent; materials to reduce slipperiness; compounds to improve gloss; emulsifiers; alkaline materials and water as the polish solvent. Generally, the total solids content of the polish ranges from about 6 to about 25 percent by weight of the composition, while the preferred total solids content of the polish is from about 9 to about 18 percent. The remainder of the composition is generally water.

The invented resins may constitute from 10 to about 70 percent by weight of the total solids in the polish compositions. Particularly good results are obtained when from about 15 to about 60 percent of the total solid content of the polish solution is the invented resins. The balance of the total solids is composed of polyethylene and polymers derived from ethylenically unsaturated monomers such as polystyrene or polyvinylacrylic, the amount of polystyrene usually being in excess of the amount of polyethylene present.

The final water emulsion polish composition of the invention is normally prepared by making a water solution of the resin portion, a water emulsion of a polyethylene portion, and a water emulsion of the polystyrene portion separately, and then mixing them together to provide the final composition. In order to improve storage stability the water emulsion polish composition is usually adjusted to a pH of at least seven and more preferably to a pH from about 7.5 to about 10.

The term "soluble" as employed in this disclosure is intended to include the concept of dispersible material in the solvent as well as complete dissolving of the material in the solvent.

RESIN SOLUTION

A solution of the invented ammonia soluble resin is readily prepared for use in a polish emulsion system. In a typical preparation, 100 parts of the alkali soluble resin and 500 parts of water are charged to a vessel which will not permit loss of volatile materials. While agitating the mixture in the vessel, about 25 parts of a 28 percent ammonium hydroxide solution is added to the vessel and agitation is continued until the solution of the resin is complete. Gentle heating may be employed to speed the solubilization. In the preparation of the resin solution, the ammonia may be replaced in whole or in part by other alkaline materials such as volatile organic amines. Suitable volatile organic amines include the aliphatic and hydroxy aliphatic amines having boiling points below about 200 degrees centigrade at a pressure of 760 millimeters of mercury, for example, morpholine, ethoxypropylamine, 2-amino-2-methyl-1-propanol ethanolamine, dimethylolamine, ethylene diamine and triethyolamine. The resin solutions generally contain from about 5 to about 25 percent solids, preferably about 15 to 20 percent solids.

POLYETHYLENE EMULSION

A typical polyethylene wax emulsion is prepared by melting 13.9 parts of a low molecular weight emulsifiable polyethylene wax having a melting point of 213 to 221 degrees Fahrenheit, at a temperature not exceeding about 270 degrees Fahrenheit. To the melted wax, 2.1 parts of oleic acid are added with agitation and the mixture is reheated to 230 degrees Fahrenheit and agitated until it is uniformly fluid where upon 2.4 parts of morpholine is added. The resulting mixture is reheated to 250 degrees Fahrenheit and agitation is continued until a uniform blend is produced. The resulting mixture is added to 81.5 parts of water. This water should be under vigorous agitation at a temperature of about 205–208 degrees Fahrenheit during the addition. The resulting emulsion is quickly cooled to room temperature.

POLYMER EMULSION

The polymer emulsion or latex, is preferably modified or unmodified. The modified resins contain minor proportions of one or more surfactants the ironic or non-ironic type emulsifying agents, particle sizing agents such as shellac, acrylic and the like. Particularly suited to the polish compositions of this invention are polystyrene resins having a molecular weight of above 5000 and more, preferably polystyrene resins having a molecular weight above 100,000. Generally, these emulsion polymers have molecular weight below 600,000 and a small particle size and are known in the art as polish emulsions. Ubatol U–2003 manufactured by UBS Chemical Corporation is typical of such polystyrene emulsion resin. These aqueous emulsions are used to provide high gloss, durability and toughness.

A typical polymer emulsion is prepared by adding to an enclosed mixing vessel 34.9 parts of a polystyrene resin having a molecular weight greater than 150,000 and a specific gravity at 25 degrees centigrade of about 1.029. With moderate agitation, 11.5 parts of water is then added to the vessel and mixing is continued until the mixture becomes uniform, whereupon a solution of polish plasticizing agents comprising 1.1 parts of dibutyl phthalate and 0.8 part of tributoxyethylphosphate and 51.6 parts of water is added to the vessel. Agitation is then continued for 20 minutes.

The practice of this invention is illustrated but not limited by the examples given below. Temperatures are expressed in degrees centigrade and all parts are by weight unless otherwise noted.

RESIN PREPARATION

Example 1

A 2 liter 3-necked flask equipped with a stirrer, vertical steam heated condenser, trap, and vertical water cooled condenser, was charged with 120 parts of propylene glycol. The glycol was heated to 120 degrees, using an electrical heating mantle and 166 parts of isophthalic acid were added. The mixture was then rapidly heated to 195–200 degrees and held at such temperature thereby effecting esterification while removing the water of condensation and some glycol unitil the charge became clear and an acid number of 75±15 was obtained. When the theoretical amount of water had been removed, the temperature was reduced to about 130 degrees and the weight of propylene glycol lost from the reaction at the higher temperature was returned to the flask. To this glycol polyester, 360 parts of rosin and 113 parts of fumaric acid was added. The mixture was heated gradually to 230 degrees and reacted at that tempature until an acid number of 150 and a melt point of about 115 degrees was reached (reaction time was approximately two hours). The resin was then dumped from the vessel and chilled rapidly. Final tests on the brittle resin indicate the following: acid number—156; melt point—113 degrees; color (Gardner)—10.

An ammonia solution of the resin (16 percent solids, 12 cubic centimeters of 28 percent ammonia per 50 grams resin) resulted in a resin solution having the following properties: Gardner Holt viscosity—$A_3$; Gardner color—10; pH of 7.9; appearance—clear.

In the same manner, the resin of the present invention is produced by reacting the polyol polyester with the reaction product of the Diels-Adler adduct of the rosin and fumaric acid to thereby obtain a correspondingly good result.

Example 2

Using the procedure of Example 1, a resin based on 9.5 moles of propylene glycol, 6.0 moles of isophthalic acid, 7.1 moles of Water White grade gum rosin and 5.8 moles of fumaric acid was prepared. The resulting resin had an acid number of 152, melt point of 117 degrees and Gardnes color number 10. An ammonia solution of this resin (16 percent solids) had a pH of 8.4, Gardner-Holt viscosity of $A_4$, Gardner color 10 and a clear appearance.

Similarly, a higher melting point resin is prepared when ethylene glycol is substituted for propylene glycol, maleic acid is substituted for fumaric acid and terephthalic acid is used as a replacement for isophthalic acid in the process of this example. A lower melting point resin is prepared in the manner of Example 2 when 1,3-butylene glycol is substituted for propylene glycol.

Examples 3 through 12

A commercially available polyester resin based on wood rosin was used to compare the compositions of this invention with those of the prior art. The commercially available resin had an acid number of 130. An ammonia solution of this resin at 16 percent solids, had a pH of 8.8, a Gardner Holt viscosity of $A_3$, a Gardner color of 10 and a clear appearance.

Water emulsion coating compositions were prepared for the coating of linoleum tile. In each case, the coating composition was prepared by stirring together the desired amount of polyethylene water emulsion (wax portion) and polystyrene water emulsion (polymer portion) and thereafter adding the ammonia soluble resin solution (resin portion). If desired, all three components of the coating solution are blended simultaneously; however, it has been found convenient to blend the coating compositions in two steps.

The compositions were applied under regular test procedures to the test linoleum tiles and the following observations were made with respect to the coatings as they were being applied and the coatings after they had been dried. The leveling abilities of the coatings, to spread out and to avoid patches of different thicknesses, were observed as the coatings were put on the tiles. The gloss of each cotaing was determined as dried, without buffing. The abilities to resist water spotting after drying were determined. Additionally, the abilities of second or subsequent polish coats to blend in with the previous coats were observed.

Storage stability was determined in accordance with American Society Testing Materials Procedure D-1791-60T. Storage at 52 degrees centigrade for two months is considered appropriate to determine equivalent storage stability at 70 degrees Fahrenheit for one year. Included in the rating symbols provided by this test procedure are OK, meaning no visible change, and G, meaning gel.

TABLE I.—POLISH COMPOSITIONS

| | Resin Solution of Example No. | Resin Solution | Polyethylene Wax Emulsion | Polymer Emulsion | Gloss | Leveling | Water Resistance | Effect Applying 2nd Coat | Stability ASTM D-1791 |
|---|---|---|---|---|---|---|---|---|---|
| Example: | | | | | | | | | |
| 3 | (1) | 40 | 10 | [4] 50 | Good | Good | Fair | Sl. Dull | OK |
| 4 | (1) | 50 | 10 | [4] 40 | | | | | OK |
| 5 | (1) | 12.6 | | [2] 87.4 | Good | Good | Fair | None | OK |
| 6 | (1) | 31 | | [3] 69 | V. good | do | Good | Sl. Dull | OK |
| 7 | (1) | 30 | 25 | [4] 45 | Fair | do | Fair | Mod. Dull | |
| Comparative: | | | | | | | | | |
| 8 | Commercial Resin [5] | 40 | 10 | [4] 50 | Good | do | do | Mod. Dull | OK |
| 9 | do.[5] | 50 | 10 | [4] 40 | | | | | G |
| 10 | do.[5] | 12.6 | | [2] 87.4 | Good | Good | Good | Sl. Dull | OK |
| 11 | do.[5] | 31 | | [3] 69 | Poor | Fair | Fair | Sl. Dull | OK |
| 12 | do.[5] | 30 | 25 | [4] 45 | Fair | Good | do | Sl. Dull | |

[1] Parts by weight of 16% solids material.
[2] Polyvinyl Acrylic.
[3] Polyvinyl Acrylic, Wax blend.
[4] Polystyrene emulsion.
[5] See Col. 6, lines 14-18 for description.

The coating results show that the gloss and leveling properties were equivalent to the control. Additionally, effects due to polish recoating and water resistance were about equivalent, both being satisfactory. Comparable surface hardness and toughness were indicated on all coatings, which were considered to be satisfactory to withstand continuous wear. Coating compositions containing the resins of this invention were noticeably lighter in color than the coatings based on the commercial resin polyesters.

The invented resins show storage stability at higher contents of resins in polish formulations than do polyester resins based on wood rosin.

Various changes and modifications may be made in the method and apparatus of this invention and in the mole ratios of the resins of this invention, certain preferred ones of which have been herein described, without departing from the spirit and scope of this invention.

What is claimed is:

1. A resinous product suitable for use as a coating composition in emulsion systems comprising an alkali soluble polymerized partial ester containing a polyol prepolymer ester containing a molar excess of a saturated glycol linked through ester linkages to an aromatic dicarboxylic compound and containing less than 10 percent ethylenic unsaturation; said polyol prepolymer being linked through ester linkages with a molar excess of a Diels-Alder adduct of rosin and an unsaturated dicarboxylic compound to form a resinous partial ester of said polyol prepolymer and adduct having an acid number of between about 70 and 200, said alkali soluble polymerized partial ester being formed by reacting under esterification conditions the aromatic dicarboxylic compound with a molar excess of the saturated glycol to form a polyol polyester, and further reacting said polyol polyester under esterification conditions with a molar excess of a Diels-Alder adduct of rosin and an aliphatic unsaturated dicarboxylic compound, to yield the said resinous product.

2. The compound of claim 1 wherein the unsaturated dicarboxylic compound contains from 4 to 6 carbon atoms.

3. The compound of claim 1 wherein the saturated glycol is of 2 to 6 carbon atoms.

4. The compound of claim 1 wherein the acid number of said resinous partial ester is about 100 to 190.

5. The compound of claim 1 having the structure

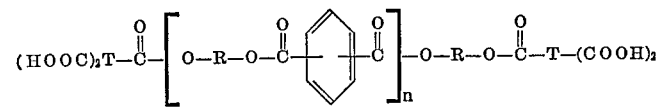

wherein R is alkyl of 2 to about 6 carbon atoms, T is the nucleus of a Diels-Alder adduct of rosin and an unsaturated dicarboxylic acid, and $n$ is 1 to 10.

6. The compound of claim 5 having structure

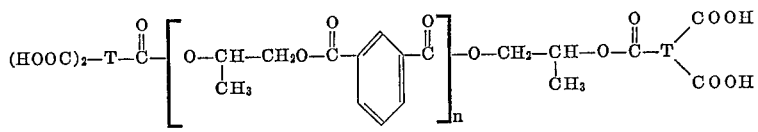

wherein T is the nucleus of a Diels-Alder adduct of rosin and an unsaturated dicarboxylic acid of 4 carbon atoms and $n$ is 1 to 10.

7. An aqueous emulsion coating composition comprising the resin compound of claim 1, a waxy polymer, a hard polymer derived from an ethylenically unsaturated monomer, emulsifier and water, said resin being present in a weight ratio to said waxy polymer and hard polymer of from about 10:90 to about 70:30 and wherein said resulting coating composition has a pH of at least 7.

8. The composition of claim 7 wherein the waxy polymer is polyethylene.

9. The composition of claim 7 wherein the hard polymer is polystyrene.

10. A process for preparing a compound of claim 1 comprising reacting under esterification conditions an aromatic dicarboxylic compound with a molar excess of a saturated glycol to form a polyol polyester, further reacting said polyol polyester under esterification conditions with a molar excess of a Diels-Alder adduct of rosin and an aliphatic unsaturated dicarboxylic compound, said polyol polyester and Diels-Alder adduct being reacted in a proportion to yield a resin having an acid number of about 70 to about 200.

References Cited

UNITED STATES PATENTS

| | | | |
|---|---|---|---|
| 2,733,224 | 1/1956 | Smith et al. | 260—26 |
| 2,973,332 | 2/1961 | Fikentscher et al. | 260—26 |
| 3,215,656 | 11/1965 | Raichle et al. | 260—26 |
| 3,218,282 | 11/1965 | Kay | 260—28.5 |

FOREIGN PATENTS 480,336   2/1938   Great Britain.

DONALD E. CZAJA, *Primary Examiner.*

W. E. PARKER, *Assistant Examiner.*

U.S. Cl. X.R.

260—28.5